United States Patent
Choi et al.

(10) Patent No.: US 8,718,675 B1
(45) Date of Patent: May 6, 2014

(54) POSITIONING REQUEST IN PAGING MESSAGES OF WIRELESS COMMUNICATION SYSTEMS

(75) Inventors: Jihwan P. Choi, San Jose, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 60 days.

(21) Appl. No.: 13/165,462

(22) Filed: Jun. 21, 2011

Related U.S. Application Data

(60) Provisional application No. 61/357,873, filed on Jun. 23, 2010.

(51) Int. Cl.
  *H04W 24/00* (2009.01)

(52) U.S. Cl.
  USPC .................. 455/456.1; 455/404.2; 455/458

(58) Field of Classification Search
  USPC ......... 455/456.1–456.6, 404.2, 458; 370/349, 370/392, 471, 474
  See application file for complete search history.

(56) References Cited

U.S. PATENT DOCUMENTS

| | | | |
|---|---|---|---|
| 2005/0215230 A1* | 9/2005 | Cheng ........................ | 455/404.2 |
| 2007/0224990 A1* | 9/2007 | Edge et al. .................... | 455/436 |
| 2010/0093376 A1* | 4/2010 | del Castillo et al. ....... | 455/456.6 |

OTHER PUBLICATIONS

3$^{RD}$ Generation Partnership Project, "Technical Specification Group Radio Access Network (E-UTRAN); Stage 2 functional specification of User Equipment (UE) positioning in E-TRAN (Release 9)", 3GPP TS 36.305 V9.2.0, Mar. 2010, 52 pages.

3$^{RD}$ Generation Partnership Project, "Technical Specification Group Radio Access Network; Evolved Universal Terrestrial Radio Access (E-UTRA); LTE Positioning Protocol (LPP) (Release 9)", 3GPP TS 36.355 V9.2.0, Jun. 2010, 112 pages.

3$^{RD}$ Generation Partnership Project, "Technical Specification Group Radio Access Network; Evolved Universal Terrestrial Radio Access (E-UTRA); Radio Resource Control (RRC); Protocol specification (Release 9)", 3GPP TS 36.331 V9.3.0, Jun. 2010, 250 pages.

* cited by examiner

Primary Examiner — Wayne Cai

(57) ABSTRACT

Systems and techniques relating to wireless communications are described. A described technique includes generating a paging message for a wireless communication device, the paging message can include a positioning request; transmitting the paging message to the wireless communication device; and receiving, during a connection establishment process, a connection message from the wireless communication device. The connection message can include a positioning response that is responsive to the positioning request.

20 Claims, 5 Drawing Sheets

POSITIONING REQUEST IN PAGING MESSAGES OF WIRELESS COMMUNICATION SYSTEMS

CROSS REFERENCE TO RELATED APPLICATION

This disclosure claims the benefit of the priority of U.S. Provisional Application Ser. No. 61/357,873, filed Jun. 23, 2010 and entitled "POSITIONING REQUEST IN PAGING MESSAGES OF CELLULAR SYSTEMS," which is incorporated herein by reference in its entirety.

BACKGROUND

This disclosure relates to wireless communications.

Wireless communication devices can use positioning signals, such as those obtained from global positioning system (GPS) satellites orbiting the earth, to determine a location estimate. Determining a location estimate can include estimating a current location of a device, estimating a velocity of a device, or both. The location estimate can be communicated within a wireless communication system to provide one or more location based services.

The devices can use one or more wireless communication technologies, such as orthogonal frequency division multiplexing (OFDM) and Code Division Multiple Access (CDMA), to communicate. In an OFDM based wireless communication system, a data stream is split into multiple data substreams. Such data substreams are sent over different OFDM subcarriers, which can be referred to as tones or frequency tones. Wireless communication devices can communicate based on one or more wireless technologies such as Long Term Evolution (LTE), Universal Mobile Telecommunications System (UMTS), Global System for Mobile Communication (GSM) protocols, systems based on CDMA such as CDMA2000 and Wideband CDMA (WCDMA), and Worldwide Interoperability for Microwave Access (WiMAX). Various examples of wireless communication devices include mobile phones, smart phones, wireless routers, wireless hubs, base stations, and access points. In some cases, wireless communication electronics are integrated with data processing equipment such as laptops, personal digital assistants, and computers.

In some wireless communications systems, a wireless communication device can use discontinuous reception (DRX) method in idle mode to reduce power consumption. By using DRX, the wireless communication device can turn on its receiver only during a pre-scheduled cyclic paging interval and turn off its receiver to enter a low power state during other times. In order to "wake up" the wireless communication device, a paging message can be sent from a network component (e.g., a base station) at a specific timeslot within the pre-scheduled paging interval. By decoding the paging message, the wireless communication device can estimate an arrival time of its data and establish or resume a connection by sending a connection request message.

SUMMARY

The present disclosure includes systems and techniques related to wireless communications. According to an aspect of the described systems and techniques, a method for wireless communications includes generating a paging message for a wireless communication device, the paging message can include a positioning request; transmitting the paging message to the wireless communication device; and receiving, during a connection establishment process, a connection message from the wireless communication device. The connection message can include a positioning response that is responsive to the positioning request. In some implementations, the positioning request can include a capability request for inquiring about one or more physical layer positioning methods supported by the wireless communication device, a location information request for requesting location data from the wireless communication device, or both. A positioning response can include location data, indicate one or more supported physical layer positioning methods supported by the wireless communication device, or both.

In another aspect, a method for wireless communications can include generating a paging message for a wireless communication device, the paging message including a positioning request; transmitting the paging message to the wireless communication device; and receiving a message from the wireless communication device. The received message can include a positioning response that is responsive to the positioning request.

These and other implementations can include one or more of the following features. A paging message can be a paging message for informing the wireless communication device about an arrival of data for the wireless communication device. Receiving the connection message can include receiving the positioning response in a connection setup complete message. A positioning request can include a capability request for inquiring about one or more physical layer positioning methods supported by the wireless communication device. The positioning response can indicate one or more supported physical layer positioning methods. The positioning request can include a location information request used for requesting location data from the wireless communication device. The positioning response can include location data associated with the wireless communication device. A location information request indicates a location estimate request or a measurement data request. A location data can include either a location estimate or measurement data. The location information request can indicate a physical layer positioning method. The location data being obtained by the wireless communication device can be responsive to the indicated physical layer positioning method. In some implementations, the paging message is of a first paging message type that is different from a second paging message type in at least one of timeslot or message format. In some implementations, the first paging message type is a positioning request paging message type. Receiving the connection message can include receiving the positioning response in a connection setup complete message. Transmitting the paging message can include transmitting a transaction identifier that includes an identity of an initiator of the positioning request and a transaction number.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

A wireless communication device can include transceiver electronics to transmit and receive wireless signals; and processor electronics in communication with the transceiver electronics. The processor electronics can be configured to receive a paging message, the paging message including a positioning request, process the positioning request to generate a positioning response, and transmit, during a connection establishment process, a connection message, the connection message including the positioning response.

A wireless communication system can include two or more base stations to communicate with wireless communication devices. The base stations can be configured to generate a paging message for a wireless communication device, the paging message including a positioning request, transmit the paging message to the wireless communication device, and receive, during a connection establishment process, a connection message from the wireless communication device, the connection message including a positioning response that is responsive to the positioning request.

Details of one or more implementations are set forth in the accompanying drawings and the description below. Other features and advantages can be apparent from the description and drawings, and from the claims.

DRAWING DESCRIPTIONS

Like reference symbols in the various drawings indicate like elements.

DETAILED DESCRIPTION

Figure 1:
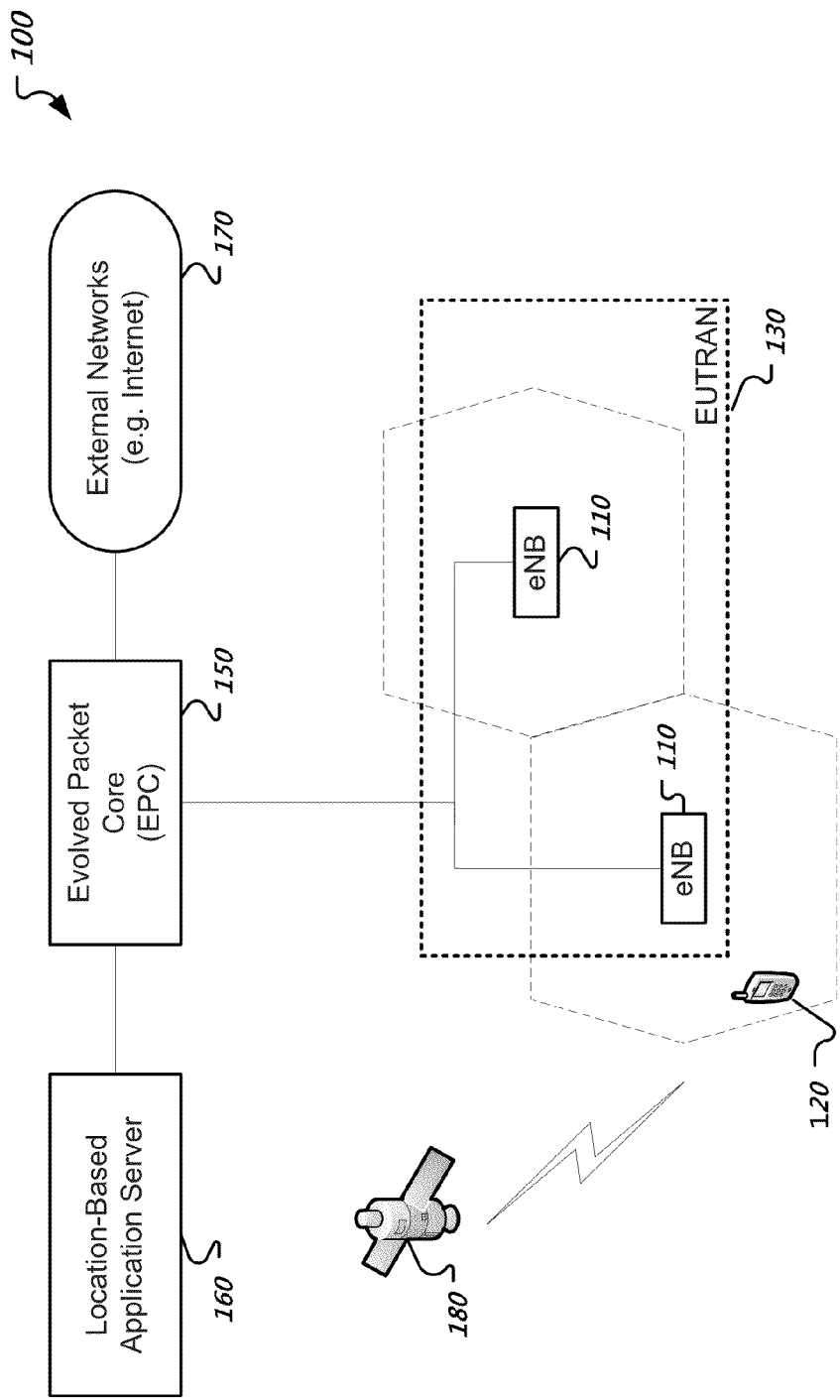
FIG. 1 shows an example of a wireless communication system.

This disclosure provides details and examples of technologies for wireless communications, including integrating paging and positioning requests into a paging message and transmitting the paging message to a wireless communication device, which can be in an idle mode, to locate the device, determine positioning capabilities of the device, inform the device of incoming data, or a combination thereof. The positioning request can be initiated by a network component such as a base station, a location server, or a mobility manager. The wireless device can send positioning information (e.g., supported positioning capabilities, positioning measurement data, or determined geographical coordinates) to one or more network components. A network component can use received positioning information from the wireless communication device to support applications such as wireless network applications or location service applications.

To receive a positioning response from a wireless communication device, which can be in an idle mode, a paging message, which includes a positioning request, can be transmitted to the wireless communication device at a cyclic pre-scheduled time interval known by the wireless communication device and the base station. In some implementations, a positioning request corresponds to a network component sending, to a wireless communication device, a request for a geographical location of the device. A wireless communication device can turn on its receiver at pre-scheduled time intervals to receive paging message(s). In some implementations, the time period between sending two consecutive paging messages can be called a paging cycle. In the rest of time in each paging cycle, the wireless communication device can turn off its receiver to reduce power consumption. In some implementations, the device can selectively turn on or off its receiver based on a paging cycle to conserve power. For example, the device can use a discontinuous reception (DRX) technique to selectively turn on or off its receiver. In some implementations, a data paging message can indicate an arrival time of data for the wireless communication device. By decoding an indicated arrival time of data, a wireless communication device can "wake-up" from the DRX mode and start continuous reception of its data based on the indicated arrival time.

A positioning request can be included in a paging message. A positioning request can include a capability request for inquiring about the wireless communication device's support for one or more physical layer positioning methods, a location information request that can be used for requesting the wireless communication device to return location data, or both. In some cases, a positioning request is a positioning capability request. In some cases, a positioning request is a location information request. Various examples of physical layer positioning methods include global positioning system (GPS), observed time difference of arrival (OTDOA), and enhanced cell ID (E-CID). Other types of physical layer positioning methods are possible. In some implementations, the data paging message can use one bit for each of the capability request and the location information request to conserve bandwidth.

In some implementations, rather than modifying a data paging message to solicit positioning data, a positioning request paging message can be defined and dedicated to requesting a positioning response from the wireless communication device. In some implementations, positioning request paging messages can be transmitted using a set of timeslots that are reserved for such messages, where data paging messages can be transmitted using a different set of timeslots. In some implementations, a positioning request paging message can have a message format that differs from a data paging message. A wireless communication device can identify the type of paging message by identifying the timeslot, message format, or both associated with the positioning request paging message. The positioning request paging message can include a capability request and a location information request. In some implementations, a capability request can include multiple bit fields for inquiry about multiple specific capabilities of a wireless communication device, such as support for specific physical layer positioning methods. In some implementations, the location information request can include multiple bit fields to control how the wireless communication device obtains location information. For example, the location information request can indicate a specific physical layer positioning method to use and a reporting interval for subsequent positioning responses.

The techniques and architectures presented herein can be implemented in a variety of wireless communication systems such as 3GPP Long Term Evolution (LTE), Universal Mobile Telecommunications System (UMTS), Global System for Mobile Communication (GSM), Worldwide Interoperability for Microwave Access (WiMAX), and systems based on Code Division Multiple Access (CDMA) such as CDMA2000 and Wideband CDMA (WCDMA). Implementations with other types of wireless communication systems are possible.

FIG. 1 shows an example of wireless communication system. In this example, the wireless communication system 100 is based on the 3GPP LTE standard, although it will be appreciated that the present disclosure is not limited to the LTE environment. The wireless communication system 100 can include one or more cellular networks 130 made up of a number of radio cells, or cells that are each served by a base station, such as an evolved Node B (eNB) base station 110. The cells are used to cover different areas in order to provide radio coverage over an area. Wireless communication devices, operated in the cellular radio coverage areas that are served by the base stations 100, can be referred to as user equipment (UE) 120. The wireless communication system 100 shown in FIG. 1 includes two base stations 110 (other numbers of base stations are possible) included in a radio access network (RAN) that is known as an evolved UMTS Terrestrial Radio Access Network (eUTRAN) 130. In the LTE example of FIG. 1, the base stations are shown as eNB base stations 110. The eUTRAN 130 includes the eNB base stations 110.

A base station 110 can operate in a mobile environment such as a femto-cell, pico-cell, or the base station 100 can operate as a node that can relay signals for other mobile and/or base stations. Base stations 110 can provide wireless services to one or more wireless communication devices 120. Base stations 110 can communicate with each other and with a core network called an evolved packet core (EPC) 150. The EPC 150 can provide wireless communication devices with access to an external network such as the Internet. The EPC 150 can include a mobility management entity (MME) (not shown). The MME can be the main control element in the EPC 150 responsible for the functionalities such as the control plane functions related to subscriber and session management. In some implementations, the MME can initiate a paging message. In some implementations, the wireless communication system 100 can include multiple radio access technologies such as WCDMA, UMTS, CDMA2000, and GSM.

The eNB base stations 110 communicate directly with the UE 120. The UE 120 can be a cellular phone, personal data assistant (PDA), smartphone, laptop, tablet computer, or other wireless communications device. Further, UEs 120 can include pagers, portable computers, Session Initiation Protocol (SIP) phones, one or more processors within devices, or any other suitable processing devices capable of communicating information using a radio technology. UE 120 can communicate directly with a serving base station to receive service when UE 120 is operated within the cell associated with the corresponding serving station. UE 120 can also receive radio signals from base stations neighboring the serving base station. The UE 120 generates requests, responses or otherwise communicates with the EPC 150 and the external network 170 via one or more eNB base stations 110.

The UE 120 can collect measurement data that can be used for determining its location through software and hardware technologies. In some implementations, a UE 120 can include a satellite signal receiver, such as a GPS receiver, a receiver for the Galileo navigation satellite system, or a receiver for the COMPASS navigation satellite system, for positioning. The UE 120, via a GPS receiver, can be configured to receive signals from GPS satellites 180 orbiting the earth and determine the GPS location of the UE 120 based, at least in part, on the received GPS signals. In some implementations, a GPS receiver can determine distances that the GPS signals have traveled by timing how long it takes for the radio waves to arrive from respective GPS satellites 180 and multiplying the travel times by the speed of light. The coordinates of geographic location (e.g., longitude and latitude coordinates) of the GPS receiver can be determined by geometrical calculations using the distance information from the multiple satellites 180. In some implementations, a UE 120 can use OTDOA or E-CID based techniques for positioning.

The EPC 150 can be in communication with a location-based application server system 160. The server system 160 can be configured to run one or more location related applications. A location related application, such as a tracking application, can trigger positioning request messages to be sent to the UE 120 at periodic intervals and can receive corresponding positioning responses from the UE 120. In some implementations, the location-based application server system 160 stores a plurality of various hosted applications, while in other implementations, the location-based application server system 160 is a dedicated server for storing and executing location related applications. In some implementations, the server system 160 can be included in equipment containing the eNB 110. In some implementations, the server system 160 is included in the EPC 150.

In some implementations, a wireless communication system uses a location determination server (not shown) to off-load location determination processing from a UE 120. For example, instead of processing received GPS signals, the UE 120 sends measurement data, obtained via receiving the GPS signals, to a location determination server within the system 100 which determines the GPS location of the UE 120. In some implementations, a location-based application server system 160 receives location information of a UE 120 via a location determination server.

Figure 2:
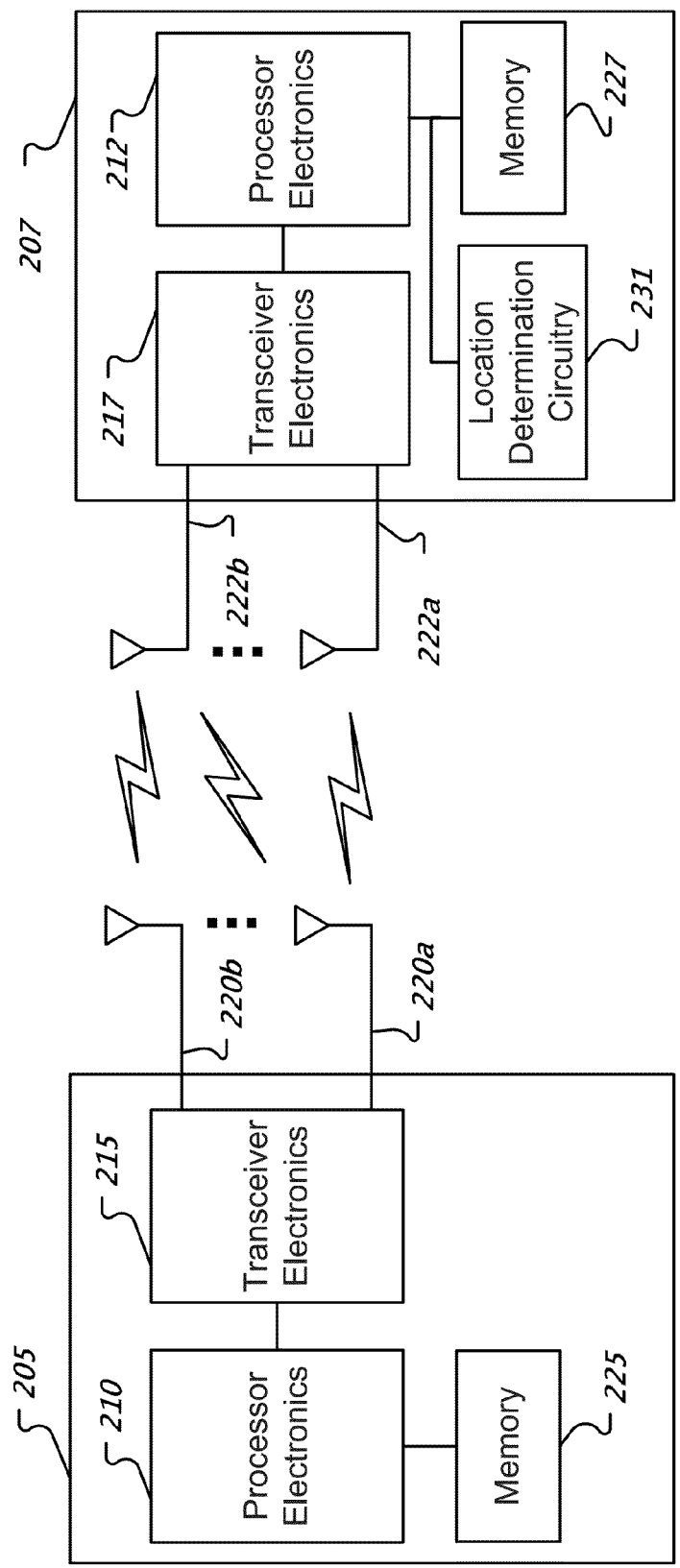
FIG. 2 shows an example of a wireless network with wireless communication devices.

FIG. 2 shows an example of a wireless network with wireless communication devices. Wireless communication devices 205, 207 such as an access point (AP), base station (BS), wireless headset, access terminal (AT), UE, client station, or mobile station (MS) can include circuitry such as processor electronics 210, 212. Processor electronics 210, 212 can include one or more processors that implement one or more techniques presented in this disclosure. The processor electronics 210 can include a central processing unit (CPU), a blade, an application specific integrated circuit (ASIC), a field-programmable gate array (FPGA), or another suitable component. Wireless communication devices 205, 207 include circuitry such as transceiver electronics 215, 217 to send and receive wireless signals over one or more antennas 220a, 220b, 222a, 222b. In some implementations, transceiver electronics 215, 217 include integrated transmitting and receiving circuitry. Wireless communication devices 205, 207 include one or more memories 225, 227 configured to store information such as data, instructions, or both. In some implementations, wireless communication devices 205, 207 include dedicated circuitry for transmitting and dedicated circuitry for receiving.

A wireless communication device 207 can include location determination circuitry 231. The location determination circuitry 231 can implement one or more physical layer (PHY) positioning methods to obtain location data. The location determination circuitry 231 can facilitate the execution of instructions for location related applications. In some implementations, the location determination circuitry 231 includes a GPS receiver. The GPS receiver can be operable to receive signals from multiple GPS satellites orbiting the earth and determines the GPS location of the wireless communication device 207 based on the received GPS signals. In some implementations, the location determination circuitry 231 is in communication with the transceiver electronics 217 to receive GPS signals. In some implementations, the location determination circuitry 231 is directly coupled with an antenna that is dedicated for receiving GPS signals. In some implementations, the processor electronics 212 implements at least a portion of the location determination circuitry 231.

In some implementations, the wireless communication device 207 receives a paging message that includes a positioning request, and processes the positioning request to generate a positioning response. In some cases, processing the positioning request can include using the location determination circuitry 231 to obtain location data. In some cases, processing the positioning request can include accessing a device configuration data structure in a memory 227 to retrieve information about supported positioning methods. The device 207 can transmit, during a connection establishment process, a connection message, where the connection message includes the positioning response.

Figure 3:
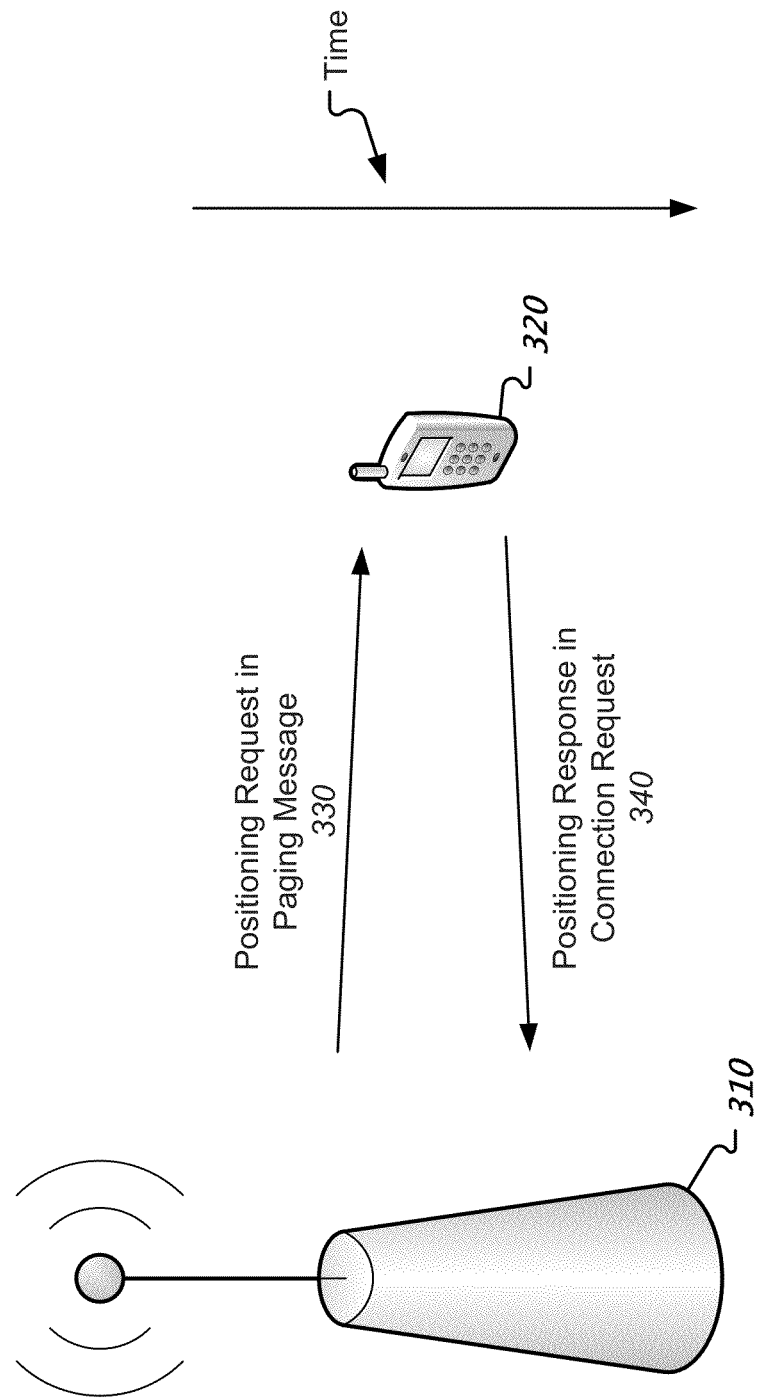
FIG. 3 shows an example of a base station paging a wireless communication device using a paging message that includes a positioning request.

FIG. 3 shows an example of a base station paging a wireless communication device using a paging message that includes a positioning request. In this example, a base station 310 transmits a paging message 330 to a wireless communication device 320. The base station 310 includes a positioning request within the paging message 330. A paging message transmitted by the base station 310 can be initiated from a network component such as a MME, a location-based application server, or the base station 330. In some implementations, the paging message 330 can be transmitted to a group of wireless communication devices.

In some implementations, the base station 310 transmits the paging message 330 based on a pre-determined set of time slots. For example, the time slots that are used to transmit the paging messages can be determined based on a function of International Mobile Subscriber Identity (IMSI) mod 1024, where IMSI can be a 15-bit unique identification associated with a wireless communication device. A group of wireless communication devices with the same last 10 bits of IMSI can receive paging messages based on a pre-determined set of time slots. In some implementations, the paging message 330 can include a data arrival indication for a specific wireless communication device 320 associated with the transmitted IMSI, and/or a Boolean indication of system information change and emergency notification to all wireless communication devices that are served by the base station 310.

The positioning request of the paging message 330 can be used for requesting information such as location related capabilities, location information, or both from the wireless communication device 320. To request for location related capabilities, a capability request can be included in the positioning request. In some implementations, the capability request can be transmitted to request information from the wireless communication device 320 regarding its support for one or more PHY positioning methods (e.g., PHY methods based on GPS, OTDOA, or E-CID). To request for location information, a location information request can be included in the positioning request. The location information request can be used for requesting location data (e.g., a location estimate or measurement data) from the wireless communication device 320. In some implementations, a location estimate includes a representation of latitude and longitude coordinates. In some implementations, a location estimate includes a velocity estimate that is determined by GPS signals.

In some implementations, the location information request can specify a specific PHY positioning method to use in obtaining location data. In some implementations, the wireless device 320 uses a pre-selected PHY positioning method. In some implementations, a transaction ID can be transmitted with the paging message. The transaction ID can include an identification of the initiator (e.g., an identity of a location-based application server) and a transaction number.

Based on receiving a paging message during a paging interval, the wireless communication device 320 can determine that the received paging message is intended for itself. Based on determining that the paging message 330 is intended for itself, the wireless communication device 320 transmits one or more messages to the base station 310, the one or more messages includes a connection request 340 that contains a positioning response, where the positioning response is in response to the positioning request included in the paging message 330. In some implementations, the received paging message causes the device 320 to start receiving location related signals such as GPS signal. In some implementations, a connection request 340 is a radio resource control (RRC) connection setup complete message. The positioning response can be piggybacked in the RCC connection setup complete message. Other types of connection messages can be used for including a positioning response.

The positioning response included in the connection request 340 can include information descriptive of the capability for PHY positioning method(s) supported by the wireless communication device, location data (e.g., location estimate or measurement data), or both. By including the positioning request in the paging message 330 and the positioning response in the connection request 340, the connection establishment and positioning are requested and responded at the same time. As such, the delay for implementing a location service and the radio resource consumption can be reduced.

Figure 4:
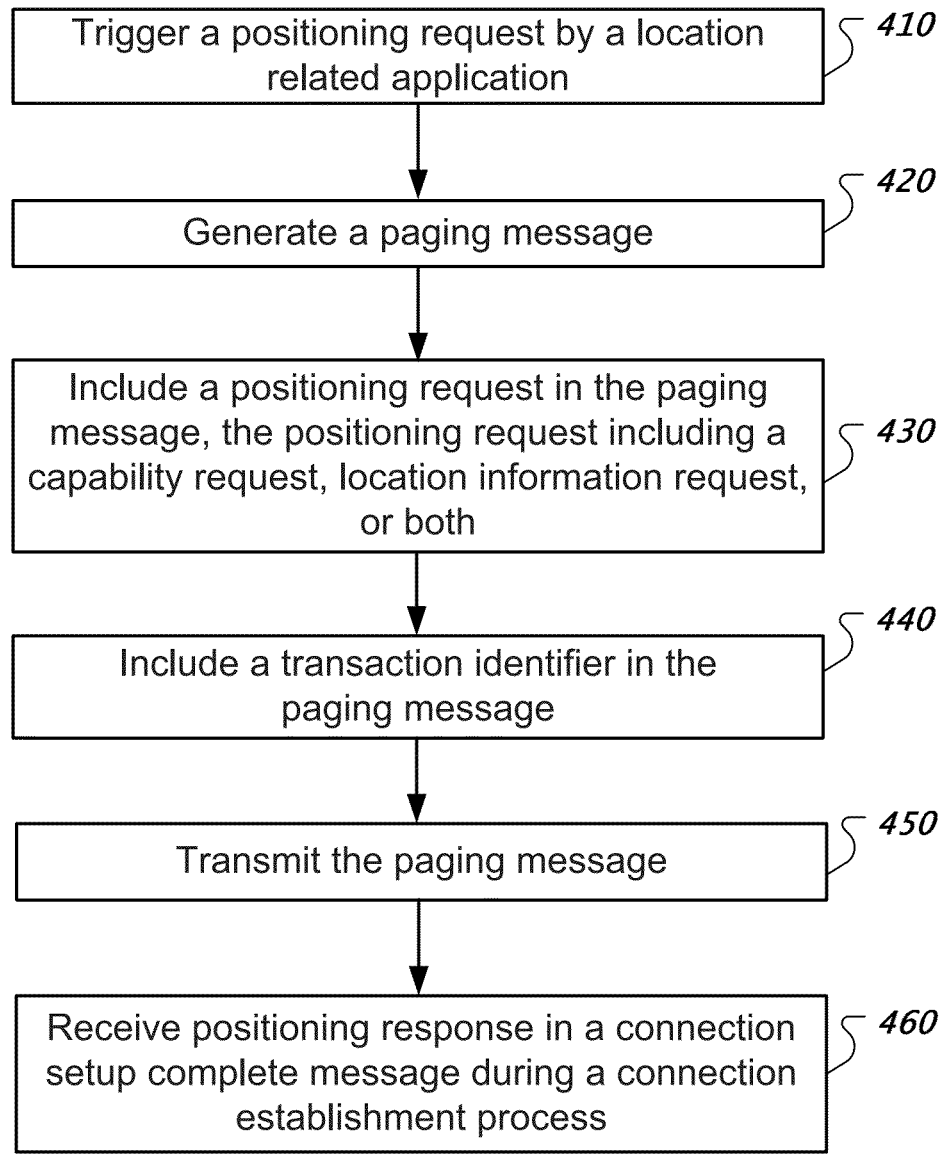
FIG. 4 shows an example communication process that includes transmitting positioning request in a paging message.

FIG. 4 shows an example communication process that includes transmitting a positioning request in a paging message. At 410, a positioning request is triggered by a location related application. The location related application can be located in the memory of a location server or other initiators within or communicably coupled with a base station. The location related application can be used for providing location service(s).

At 420, a paging message is generated. In some implementations, the paging message is a paging message for informing the wireless communication device about an arrival of data for the wireless communication device. In some implementations, the paging message can be a paging message for an incoming voice call. In some implementations, the paging message is a data paging message that includes information descriptive of an arrival time (e.g., a future transmission) of data for a wireless communication device. The wireless communication device, for which the paging message is intended, can determine a time to "wake-up" from a DRX mode and establish a new connection or restart a previously established connection with the base station based on the information included in the paging message.

At 430, a positioning request is included in the paging message. The positioning request can include a capability request, a location information request, or both. The paging message can be transmitted in a pre-scheduled time interval through a transmit channel to cause a connection establishment. In some implementations, generating a paging message includes generating a paging message with a positioning request.

At 440, a transaction identifier is included in the paging message. A transaction identifier can include an identity of an initiator of the positioning request and a transaction number. In some implementations, in order to reduce message size, the identification of an initiator of the paging process can be omitted. As such, a default initiator can be assumed. In some implementations, the default initiator is the location server. Further, the transaction number can be set to a default number (e.g., zero) by limiting one location related transaction per wireless communication device during idle mode. In some implementations, the transaction number is not required.

At 450, the paging message is transmitted. Transmitting a paging message can include transmitting a signal that includes the paging message. When a wireless communication device receives the paging message in a paging interval and determines that the paging message is intended for itself, the device can decode the paging message and respond to the positioning request included therein. In response to a capability request being included in the positioning request, the wireless communication device can provide a positioning response of whether each of the location related capabilities identified by the capability request is supported. In response to a location information request being included in the positioning request, the wireless communication device can obtain location data and provide a positioning response that includes the location data. The location information request can indicate a physical layer positioning method such that the location data obtained by the wireless communication device is responsive to the indicated physical layer positioning method. In some implementations, the wireless communication uses a default physical layer positioning method to obtain location data. The positioning response can be transmitted back to the base station piggybacked in a RRC connection setup complete message for connection establishment between the base station and the wireless communication device. In some implementations, a connection setup complete message indicates to a base station that a device has successfully established the connection and that the device is ready to receive data via the connection from the base station, send data via the connection to the base station, or both.

At 460, the positioning response is received in a connection setup complete message during a connection establishment process. The base station can decode the positioning response to obtain the requested location related information from the wireless communication device. Receiving the connection message can include receiving the positioning response in a connection setup complete message. In some implementations, a connection establishment process is a RRC connection establishment process. Receiving a connection message can include receiving a RRC connection setup complete message.

To save radio resource, reduce processing complexity, or both, the capability request and location information request can be limited in terms of message size. For example, a positioning request can include one or more bit fields. In some implementations, one bit is allocated to each of the capability request and the location information request. In some implementations, the one bit dedicated to the capability request can be used to inquire about all of the location related capabilities that are supported by the wireless communication device. In some implementations, the capability request can include a vector of one-bit-wide fields that correspond to different capabilities. Various examples of inquired capabilities include PHY positioning methods and types of location information determination capabilities (such as determination of location coordinates or determination of a velocity of the wireless communication device). In some implementations, the one bit dedicated to the location information request can be used to request the wireless communication device to send a location estimate, measurement data, or both based on common information element(s). The common information element can be independent of a PHY positioning method. Further, based on using one bit to request location data that are not dependent on PHY positioning method, the wireless communication device can use default parameter settings (e.g., reporting amount, interval, or Quality of Service) for reporting location information to the base station. In some implementations, if both the capability and location information are requested, one bit can be transmitted for each of the capability request and the location information request for requesting information.

Figure 5:
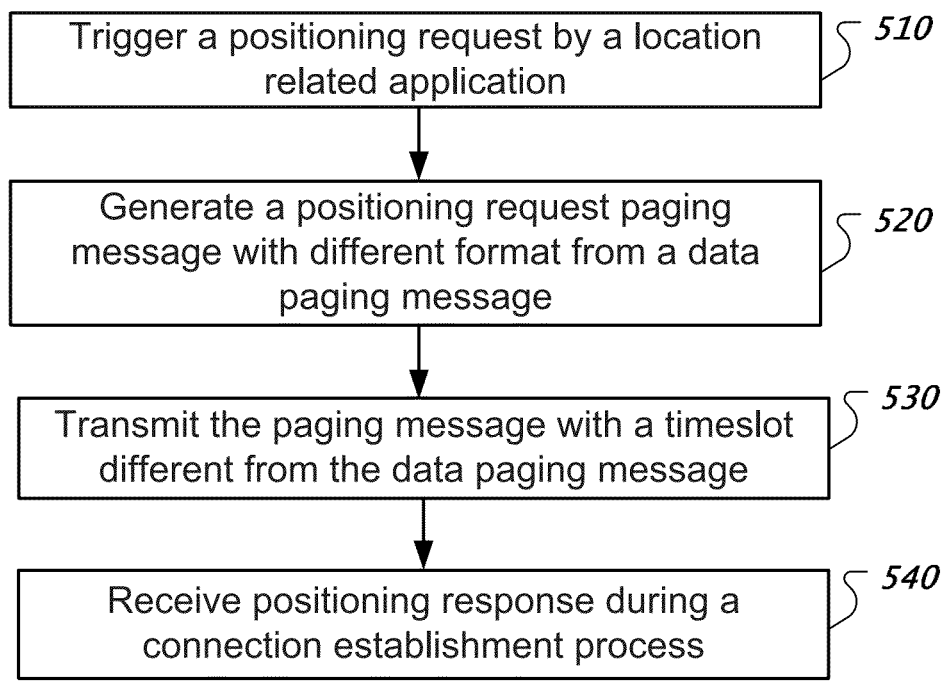
FIG. 5 shows an example communication process that includes transmitting a positioning request paging message.

FIG. 5 shows an example communication process that includes transmitting a positioning request paging message. At 510, a positioning request is triggered by a location related application. The location related application can be located in the memory of a location server or other initiators within or communicably coupled to a base station. At 520, a positioning request paging message is generated. In some implementations, the positioning request paging message can have a message format different from other paging messages used in a wireless communication system such as a data paging message. In some implementations, the positioning paging message can be transmitted at a pre-determined time interval that is different from a time interval for transmitting a data paging message. In some implementations, a wireless communication device can identify the type of a paging message based on using the message format, a transmitted time interval of the paging message, or both. In some implementations, the transmitted positioning request paging message can include a dedicated data field to indicate its message type.

The positioning request paging message can indicate a positioning request. A positioning request portion of the positioning request paging message can include a capability request, a location information request, or both. In some implementations, the location information request indicates a location estimate request or a measurement data request that causes the wireless device to send location data that includes a location estimate or measurement data, respectively.

At 530, the positioning request paging message is transmitted. In some implementations, the positioning request paging message includes a transaction ID. A transaction ID can include the identification of an initiator and a transaction number. The positioning request paging message can be sent at a time interval that is different from a time interval reserved for a data paging message. When a wireless communication device receives the positioning request paging message and determines that the paging message is intended to itself, it can decode the paging message and respond to the positioning request. In some implementations, if a capability request is identified, in response to the capability request, the wireless communication device can provide a response of whether each of the specifically requested location related capabilities can be supported. If a location information request is identified, in response to the location information request, the wireless communication device can provide a response with the related location estimate, measurement data, or both, based on the specific parameters and PHY positioning method (if any is decoded).

At 540, the positioning response is received during a connection establishment process. The base station can decode the positioning response to obtain the requested location related information from the wireless communication device. Receiving the connection message can include receiving the positioning response in a connection setup complete message. In some implementations, receiving the connection message includes receiving a RRC connection setup complete message.

In some implementations, the message size of the capability request and location information request can be one or more bits. One or more bits dedicated to the capability request can be used to inquire the capability of the wireless communication device for its supportability of a specific PHY positioning method. One or more bits can be dedicated to the location information request. System default parameters can be overwritten by wireless communication device specific parameters to generate a location information request that is customized to the capabilities of the device. In some implementations, location related information based on a specific PHY positioning method can be requested. Moreover, in some implementations, it can be specified in the location information request that either a location estimate or measurement data are to be sent back from the wireless communication device.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
generating a paging message for a wireless communication device, the paging message including a positioning request, wherein the positioning request comprises (i) a first bit field defined to indicate a capability request for inquiring about one or more physical layer positioning methods supported by the wireless communication device, and (ii) a second bit field defined to indicate a location information request for retrieving a location estimate or location measurement data from the wireless communication device;
transmitting the paging message to the wireless communication device; and
receiving, during a connection establishment process, a connection message from the wireless communication device, the connection message including a positioning response that is responsive to the positioning request.

2. The method of claim 1, wherein the paging message is a paging message for informing the wireless communication device about an arrival of data for the wireless communication device, and wherein receiving the connection message comprises receiving the positioning response in a connection setup complete message.

3. The method of claim 1, wherein generating the paging message comprises indicating the capability request for inquiring about one or more physical layer positioning methods supported by the wireless communication device, and wherein the positioning response indicates one or more supported physical layer positioning methods.

4. The method of claim 1, wherein generating the paging message comprises indicating the location information request, wherein the positioning response includes location data associated with the wireless communication device, and wherein the location data comprises either a location estimate or measurement data.

5. The method of claim 4, wherein:
the location information request indicates a physical layer positioning method; and
the location data being obtained by the wireless communication device is responsive to the indicated physical layer positioning method.

6. The method of claim 1, wherein:
the paging message is of a first paging message type that is different from a second paging message type in at least one of timeslot or message format;
the first paging message type is a positioning request paging message type; and
receiving the connection message comprises receiving the positioning response in a connection setup complete message.

7. The method of claim 1, wherein transmitting the paging message comprises transmitting a transaction identifier that includes (i) an identity of an initiator of the positioning request and (ii) a transaction number.

8. A wireless communication device, comprising:
transceiver electronics to transmit and receive wireless signals; and
processor electronics in communication with the transceiver electronics, the processor electronics being configured to
(i) receive a paging message, the paging message including a positioning request wherein the positioning request comprises a first bit field defined to indicate a capability request for inquiring about one or more physical layer positioning methods supported by the wireless communication device, and a second bit field defined to indicate a location information request for retrieving a location estimate or location measurement data from the wireless communication device, (ii) process the positioning request to generate a positioning response that is responsive, at least, to the first bit field and the second bit field, and (iii) transmit, during a connection establishment process, a connection message, the connection message including the positioning response.

9. The wireless communication device of claim 8, wherein the paging message is a paging message for informing the wireless communication device about an arrival of data for the wireless communication device, and wherein the connection message is a connection setup complete message.

10. The wireless communication device of claim 8, wherein the positioning request a indicates the capability request for inquiring about one or more physical layer positioning methods supported by the wireless communication device, and wherein the positioning response indicates one or more supported physical layer positioning methods.

11. The wireless communication device of claim 8, wherein the positioning request indicates the location information request, wherein the positioning response includes location data associated with the wireless communication device, and wherein the location data comprises either a location estimate or measurement data.

12. The wireless communication device of claim 11, wherein:
the location information request indicates a physical layer positioning method; and
the location data being obtained by the wireless communication device is responsive to the indicated physical layer positioning method.

13. The wireless communication device of claim 8, wherein:
the paging message is of a first paging message type that is different from a second paging message type in at least one of timeslot or message format; and
the first paging message type is a positioning request paging message type.

14. A system, comprising:
two or more base stations to communicate with wireless communication devices, the base stations configured to
(i) generate a paging message for a wireless communication device, the paging message including a positioning request, wherein the positioning request comprises a first bit field defined to indicate a capability request for inquiring about one or more physical layer positioning methods supported by the wireless communication device, and a second bit field defined to indicate a location information request for retrieving a location estimate or location measurement data from the wireless communication device, (ii) transmit the paging message to the wireless communication device, and (iii) receive, during a connection establishment process, a connection message from the wireless communication device, the connection message including a positioning response that is responsive to the positioning request.

15. The system of claim 14, wherein the paging message is a paging message for informing the wireless communication device about an arrival of data for the wireless communication device, and wherein receiving the connection message comprises receiving the positioning response in a connection setup complete message.

16. The system of claim 14, wherein the positioning request indicates the capability request for inquiring about one or more physical layer positioning methods supported by the wireless communication device, and wherein the positioning response indicates one or more supported physical layer positioning methods.

17. The system of claim 14, wherein the positioning request indicates the location information request, wherein the positioning response includes location data associated with the wireless communication device, and wherein the location data comprises either a location estimate or measurement data.

18. The system of claim 17, wherein:
the location information request indicates a physical layer positioning method; and
the location data being obtained by the wireless communication device is responsive to the indicated physical layer positioning method.

19. The system of claim 14, wherein:
the paging message is of a first paging message type that is different from a second paging message type in at least one of timeslot or message format;
the first paging message type is a positioning request paging message type; and
receiving the connection message comprises receiving the positioning response in a connection setup complete message.

20. The system of claim 14, wherein transmitting the paging message comprises transmitting a transaction identifier that includes (i) an identity of an initiator of the positioning request and (ii) a transaction number.

* * * * *